Aug. 28, 1956 A. E. CASTLETON 2,760,433

ROTARY PRINTING DEVICES IN AUTOGRAPHIC REGISTERS

Filed Feb. 27, 1952 2 Sheets-Sheet 1

INVENTOR

Albert Edward Castleton

BY Watson, Cole, Grindle & Watson

ATTORNEYS

Aug. 28, 1956 A. E. CASTLETON 2,760,433
ROTARY PRINTING DEVICES IN AUTOGRAPHIC REGISTERS
Filed Feb. 27, 1952 2 Sheets-Sheet 2
FIG. 3.
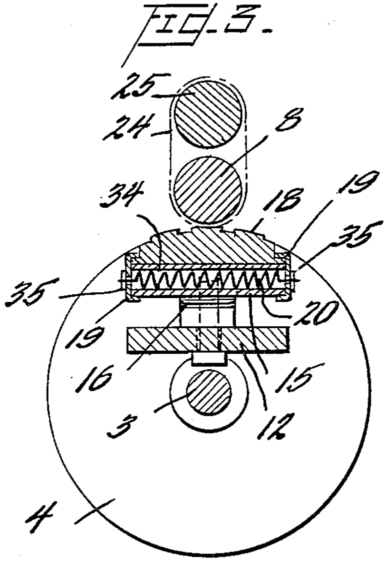
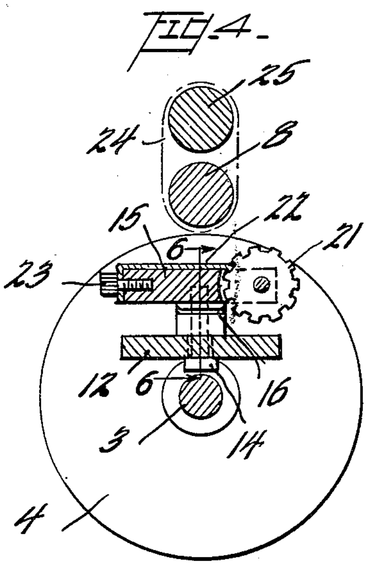
FIG. 5.
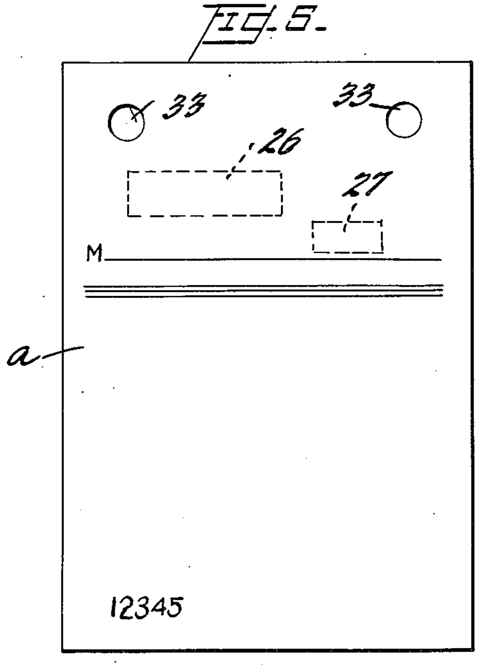
FIG. 6.
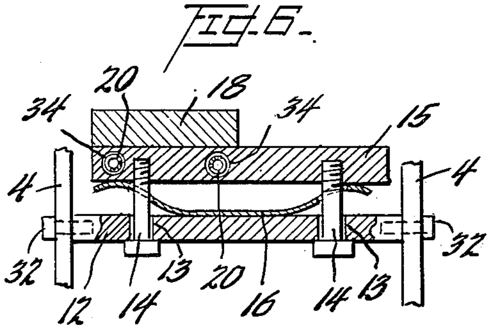
INVENTOR
Albert Edward Castleton
BY Watson, Cole, Grindle & Watson
ATTORNEYS United States Patent Office 2,760,433

Patented Aug. 28, 1956

2,760,433

ROTARY PRINTING DEVICES IN AUTOGRAPHIC REGISTERS

Albert Edward Castleton, Upminster, England

Application February 27, 1952, Serial No. 273,756

4 Claims. (Cl. 101—228)

This invention relates to autographic registers of the kind in which record strips are fed over a writing plate for the entry of matter to be recorded such as described, for example, in the specification of British Letters Patent No. 299,616. In this prior specification the record strips are fed by friction drive means which include friction feed discs so arranged that the record strips are frictionally engaged and fed between the discs and a pressure roller. The invention, however, also relates to autographic registers wherein the feeding is effected by pin wheels engaging perforations at one or both edges of the record strips.

In some cases it is desired to record the address of a particular branch of a business, for example on the record strips and this is conveniently done by a suitable arrangement of the register rather than by supplying a set of record strips with the address already printed thereon.

Thus record strips can be supplied to a business in bulk and used by all branches, the address of each branch being applied to the strips as they pass through the registers used at the particular branch. The printing operation which applies the address may also apply the date or any other distinguishing mark or printed matter desired.

It is an object of the present invention to provide improved means whereby the operation of the register prints the desired data on the record strips.

According to the present invention an autographic register of the kind referred to is provided with a disc or its equivalent rotatably mounted in the register and carrying one or more printing members, the disc or the like being connected with the register operating the mechanism whereby it is rotated to print an impression on the record strip each time the register is operated.

By arranging a printing member at different positions circumferentially of the disc or its equivalent, data can be printed at the head, foot or any other desired portion of the forms constituting the record strip.

Figure 1:
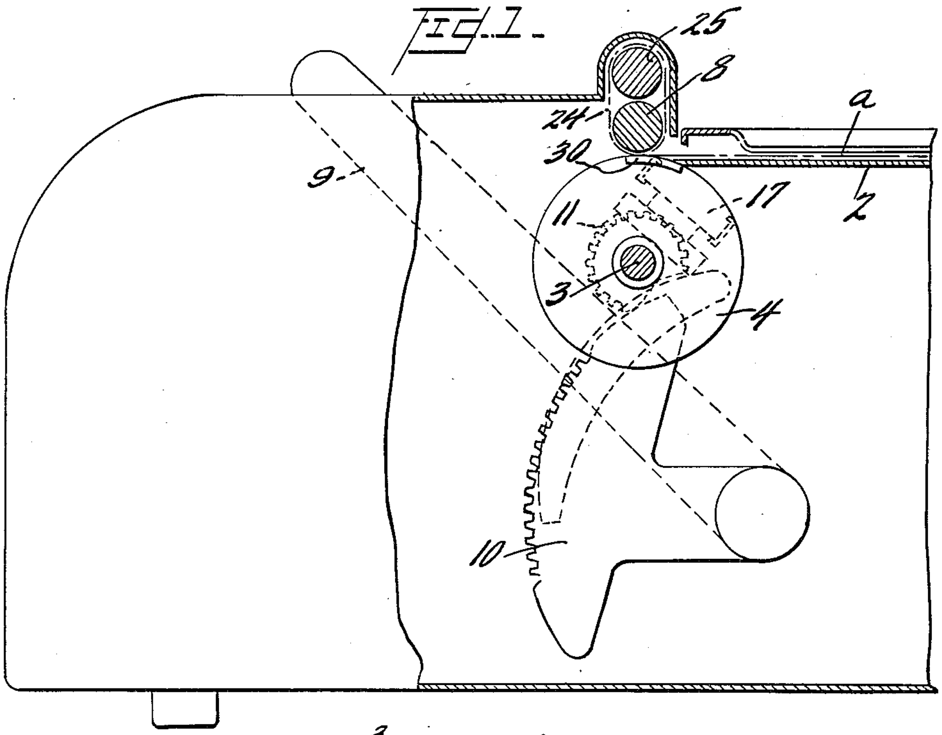

To enable the invention to be fully understood it will now be described with reference to the accompanying drawings in which:

Fig. 1 is a fragmentary side elevation partly in section of an autographic register embodying one form of the invention.

Figure 2:
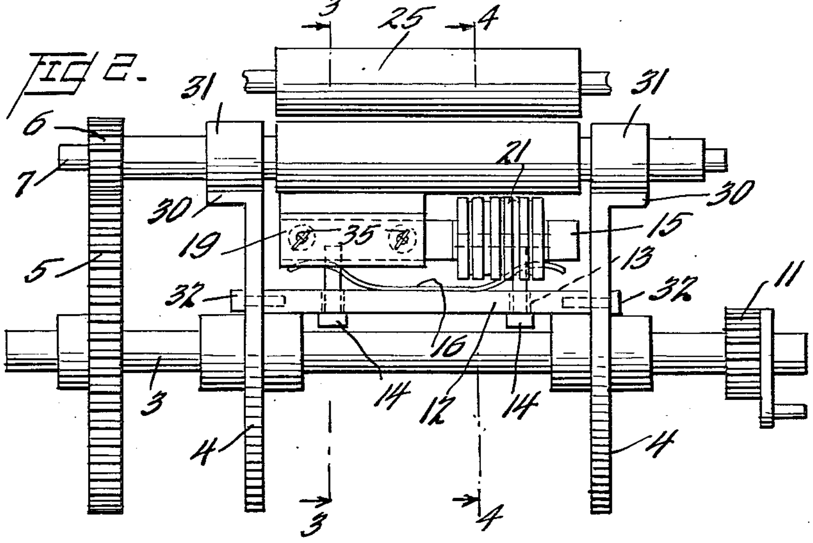

Fig. 2 is an end view on an enlarged scale of the feed and printing means of Fig. 1 with main shaft 3 and the elements carried thereby rotated approximately 45° counterclockwise from the position of Fig. 1, the remainder of the register being omitted for purposes of clarity, Fig. 3 is a section on line 3—3 of Fig. 2, Fig. 4 is a section on line 4—4 of Fig. 2, Fig. 5 indicates a form to be imprinted which constitutes part of the series of superposed record strips which are fed through the register, and Figure 6 is a longitudinal cross-section view taken substantially along line 6—6 in Figure 4.

As shown in the accompanying drawings 1 indicates the register casing and 2 the writing platen over which the forms *a* are adapted to be fed for entry of matter to be recorded. As shown the main operating shaft 3 of the register is provided with a pair of strip feed discs 4 and a gear 5 which meshes with a pinion 6 on a shaft 7 having a pressure roller or platen 8. The shaft 3 is adapted to be rotated in known manner by the pivotal movement of a manually actuated lever 9 which is adapted to rotate a toothed quadrant 10 meshing with a pinion 11 on the shaft 3. As the shaft actuating arrangement is conventional and has no direct bearing on the present invention, the elements constituting the arrangement have not been shown and will not be described in detail. For a purpose to be hereinafter explained, there is provided on the periphery of each of discs 4 a segmental flange or laterally projecting lug 30 of limited peripheral extent, the outer face of which conforms to the peripheral configuration of discs 4. Shaft 7 carries adjacent each end of platen 8 an integral collar 31 which is in transverse alignment with one of the discs 4 and has an axial dimension at least equal to the combined thickness, i. e., axial dimension, of disc 4 and lug 30. Discs 4 and collars 31 constitute the record strip advancing means, being adapted to frictionally engage the record strip therebetween and it will be understood that each time the lever 9 is operated the feed discs 4 and pressure roller 8 will be rotated to feed a form length out of the register and the next form length onto the writing platen in known manner.

A platform 12 extends between the discs 4 and is secured to the discs as by screws 32. The platform is formed with apertures 13, in which studs 14 are slidably mounted, the studs screwing into a carrier 15 which is resiliently supported by a leaf spring 16 so that the carrier is movable radially of the discs 4 with the studs 14 serving as guides.

A printing plate 17, which may be cast, is supported by one portion of carrier 15, the plate having a flat undersurface resting on the carrier and an arcuate top surface conforming to the periphery of discs 4 with printing surfaces or characters 18 projecting slightly above the top surface. To permit plate 17 to be removed from and replaced on the carrier at will, it is held in place by channel-shaped end clips 19, the lower flanges of the clips engaging an edge of the carrier and the upper flanges engaging an edge of the plate. Clips 19 are urged together by coil springs 20 which extend through transverse bores 34 in the carrier, being attached at each end to a clip in any suitable fashion, as by pins 35. A date wheel or the like 21 is rotatably mounted in a recess in another portion of carrier 15 and is locked in adjusted position by a leaf spring latch 22 having a free end engaging a notch in the wheel, and a base secured to the carrier by a thumb screw 23. It will be understood that the printing members may be mounted at any desired positions on the discs according to the portion of the form of the record strip that is to receive the imprinting.

The top copy of the record strip is imprinted by providing an endless band 24 of transfer or inking ribbon looped round the pressure roller 8 and a second roller 25 which is spring urged by means not shown to keep the ribbon taut. The imprinting of underlying copies of a record strip comprising a series of superposed webs, may be effected by providing localised areas 26, 27 (Fig. 5) of carbon material on the backs of the webs so as to be offset on to the front of the underlying webs when the printing members make an impression. As shown in Fig. 5 the area 26 may be adapted to be imprinted with the branch name and address and the area 27 with the date or code number.

The printing members are urged by the spring 16 (Fig. 2) to a position where printing surfaces 18 project slightly beyond the periphery of the discs 4, so that by virtue of the resilient mounting an efficient printing impression is made despite any irregularities in the type faces or the pressure roller.

Instead of the loop 24 of transfer material, a transversely fed carbon ribbon may be provided or means such as an inky impregnated roller may be provided for producing the impression upon the top form of the record strips.

The printing plate 17 is readily removable to change the data to be printed and the wheel 21 may be adapted to be rotated to change the date or code number by a rod or the like adapted to be coupled to the wheel and manually operable from outside the register.

The pressure roller 8 may be formed wholly or in part of hard rubber or other material which will provide a platen surface suitable for printing purposes. If desired the pressure roller may include inserts of hard rubber or other suitable material disposed at positions for cooperative engagement with the printing members.

It will be understood that by mounting the printing members in the initial, medial or final feed portions of the disc or discs 4, the desired data can be printed at the head, medial or foot portions of the form or at two or more positions on each form.

The operation of the invention will be readily understood. When lever 9 is depressed, discs 4 and collars 31 rotate in opposite directions and cooperate to remove one form of the record strip from the register and to bring another onto writing platen 2. While the first-mentioned form is being removed, it passes between platen 8 and printing members 18 and 21 which cooperate to imprint the top copy of the strip by means of transfer ribbon 24 and the underlying copies, where desired, by means of carbon material provided on the backs of all copies except the bottom one. The data imprinted may include such information as the branch address, the date, a code number, etc. As is customary, the copies of the record strip have spaced pairs of apertures 33 therein, the apertures in all copies being in registration. These apertures 33 are in line with discs 4, being slightly larger in diameter than the axial dimension of discs 4. When, during feeding of the strip, apertures 33 coincide with the "bite" of platen 8 and discs 4, frictional engagement of these elements with the strip is lost. However, since lugs 30 project outside the paths of apertures 33 and constitute, in effect, a lateral extension of the periphery of discs 4, the strip is gripped between the lugs and the platen so that feeding of the strip can be resumed.

The invention provides a simple but efficient means for printing information on record strips as they are fed through the register, the printing being effected by rolling action of the disc and pressure roller which ensures legible printing and also enables the printing to be effected while the record strips are actually moving through the register.

I claim:

1. In an autographic register in which a record strip is advanced over a writing plate, the combination of a rotatable shaft, a pair of vertically arranged discs carried by said shaft in spaced parallel relationship, having their periphery in contact with one side of said strip, a cross-member fixedly disposed between said discs, a carrier member resiliently mounted on said cross-member, at least one printing member removably supported by said carrier member, said member having raised printing surfaces thereon which project beyond the periphery of said discs and contact the said side of said strip, a rotatable cylindrical platen on the other side of said strip which is adapted to support the strip against said printing surfaces during a printing operation, means associated with said platen for effecting a printing impression on the portions of said strip contacted by said printing surfaces, means spaced axially from each end of said platen and rotating therewith, being in substantial vertical registration with each of said discs, said means and said discs being adapted to frictionally engage said strip therebetween to advance the strip, and means for rotating said shaft and said platen.

2. In an autographic register in which a record strip is advanced over a writing plate, the combination of a rotatable shaft, a pair of vertically arranged discs carried by said shaft in spaced parallel relationship having their periphery in contact with one side of said strip, a cross-member fixedly disposed between said discs, a carrier member resiliently mounted on said cross-member, at least one printing member resiliently mounted on said carrier member, said printing member having raised printing surfaces thereon which project beyond the periphery of said discs to contact said side of the strip, a second rotatable shaft spaced from said first shaft and operatively coupled thereto, spaced cylindrical members disposed on said shaft in general vertical registration with said discs, being in contact with the other side of said strip and cooperating with said discs to frictionally advance said strip, a pressure roller carried by said second shaft intermediate said cylindrical members, an endless transfer ribbon passing around said roller and adapted to effect a printing impression on the portions of said strip contacted by the raised printing surfaces, and manually operated means for rotating said shafts and the members carried thereby.

3. In an autographic register in which a record strip is advanced over a writing plate, the combination of a rotatable shaft, a cross member fixedly supported on said shaft, a carrier member resiliently mounted on said cross-piece, a printing member adapted to be supported by said carrier member, means on said carrier member for removably engaging said printing member to maintain the same on said carrier member, said printing member having raised printing surfaces which during a printing operation contact one side of said strip, a rotatable cylindrical platen supporting said strip on the other side thereof, means associated with said platen for effecting a printing impression on the portions of said strip contacted by said printing surfaces and means carried by said shaft and said platen cooperating to frictionally engage the strip to advance the same and means for rotating said shaft and platen.

4. A register as in claim 3 wherein said engaging means on said carrier member comprises means at each side of said carrier member and movable laterally away therefrom, said means being adapted to engage the marginal portions of said printing member and resilient means urging said laterally movable means against the sides of said carrier member to hold said printing member in place on said carrier member.

References Cited in the file of this patent

UNITED STATES PATENTS

| | | |
|---|---|---|
| 443,960 | Gibbs | Dec. 30, 1890 |
| 466,067 | Wilson | Dec. 29, 1891 |
| 568,454 | Norcross | Sept. 29, 1896 |
| 587,422 | Biette | Aug. 3, 1897 |
| 835,903 | Grant | Nov. 13, 1906 |
| 967,896 | Frey | Aug. 23, 1910 |
| 1,086,167 | Hall | Feb. 3, 1914 |
| 1,532,837 | Seiders | Apr. 7, 1925 |
| 1,832,007 | Eckland | Nov. 17, 1931 |
| 1,853,792 | Wheelbarger | Apr. 12, 1932 |
| 2,116,609 | Shomaker | May 10, 1938 |

FOREIGN PATENTS

| | | |
|---|---|---|
| 153,133 | Great Britain | Nov. 4, 1920 |